(12) United States Patent
Evans et al.

(10) Patent No.: US 6,800,314 B2
(45) Date of Patent: Oct. 5, 2004

(54) MULTI-TIER ROTARY GRILL

(75) Inventors: John C. Evans, Cincinnati, OH (US); A. Scott Perttola, Fairfield, OH (US)

(73) Assignee: Gold Medal Products Company, Cincinnati, OH (US)

( * ) Notice: Subject to any disclaimer, the term of this patent is extended or adjusted under 35 U.S.C. 154(b) by 6 days.

(21) Appl. No.: 09/904,151

(22) Filed: Jul. 12, 2001

(65) Prior Publication Data

US 2003/0010218 A1 Jan. 16, 2003

(51) Int. Cl.$^7$ ............................................... A47D 37/00
(52) U.S. Cl. ....................... 426/233; 426/466; 426/523; 99/326; 99/331; 99/334; 99/443 R; 99/395; 99/441; 219/214
(58) Field of Search ...................... 99/326, 331, 334, 99/386, 393, 395, 443 R, 443 C, 441; 426/233, 466, 523; 219/59.1, 214, 469–471

(56) References Cited

U.S. PATENT DOCUMENTS

| | | | |
|---|---|---|---|
| 839,236 A | * | 12/1906 | Vartanian |
| 1,480,119 A | * | 1/1924 | Schey |
| 1,630,644 A | * | 5/1927 | Troiel |
| 2,584,061 A | | 1/1952 | Stilphen ...................... 99/423 |
| 2,631,525 A | | 3/1953 | Finizie .......................... 99/423 |
| 2,905,076 A | | 9/1959 | Francia ......................... 99/443 |
| 3,084,616 A | * | 4/1963 | Nissen et al. ................. 99/423 |
| 3,125,015 A | * | 3/1964 | Schlaegel ..................... 99/421 |
| 3,298,303 A | | 1/1967 | Waller ......................... 99/423 |
| 3,335,262 A | | 8/1967 | Smart et al. ................. 219/474 |
| 3,854,392 A | * | 12/1974 | Eason ..................... 99/421 H |
| 3,901,136 A | * | 8/1975 | Wilson et al. ............... 99/352 |
| 4,380,192 A | | 4/1983 | Doren ......................... 99/441 |
| 4,516,485 A | | 5/1985 | Miller ......................... 99/339 |
| 4,633,772 A | | 1/1987 | Bowden et al. .............. 99/332 |
| 4,982,657 A | | 1/1991 | Ghenic ........................ 99/421 |
| 4,996,912 A | | 3/1991 | Theimer et al. .............. 99/358 |
| 5,117,748 A | | 6/1992 | Costa .......................... 99/441 |
| 5,421,246 A | * | 6/1995 | Tippmann et al. ............ 99/448 |
| 5,471,915 A | * | 12/1995 | Lopata ..................... 99/421 H |
| 5,533,440 A | * | 7/1996 | Sher ....................... 99/421 HH |
| 5,611,263 A | * | 3/1997 | Huang ......................... 99/339 |
| 6,393,971 B1 | * | 5/2002 | Hunot et al. ................. 99/341 |

* cited by examiner

*Primary Examiner*—Drew Becker
(74) *Attorney, Agent, or Firm*—Wood, Herron & Evans, LLP

(57) ABSTRACT

A multi-tier rotary grill for grilling and heating food items such as hot dogs, sausages, metts and similar food items. The rotary grill includes heated rollers that are arranged in vertically spaced apart roller tiers. The rollers in the multiple roller tiers lie in common respective planes that are substantially parallel to each other and may slope upwardly from a front to a back of the rotary grill.

24 Claims, 2 Drawing Sheets

MULTI-TIER ROTARY GRILL

FIELD OF THE INVENTION

The present invention relates generally to cooking apparatus for heating food items and, more particularly, to a rotary grill and method for grilling and heating food items such as hot dogs, sausages, metts and similar food items.

BACKGROUND OF THE INVENTION

Conventional rotary grills used for heating hot dogs and similar food items include a series of parallel, elongated rollers that are mounted to rotate about respective horizontal axes relative to a housing of the rotary grill. The rollers are typically made of metal or other heat conductive material and are arranged to lie in a generally common plane within a grilling area of the rotary grill. The rollers may lie in a generally horizontal plane or, alternatively, may be arranged in an inclined plane that slopes upwardly from the front toward the rear of the housing. The rollers are spaced apart from each other a sufficient distance so that hot dogs or similar food items can be placed between and supported by adjacent pairs of the rollers. A drive mechanism, such as a motor-driven chain or similar drive mechanism, is connected to the rollers for rotating the rollers in contact with the hot dogs so that the hot dogs are evenly heated or grilled. Typically, the hot dogs are first grilled at an elevated temperature to thoroughly heat and cook the items and then the temperature of the rollers is reduced so that the hot dogs are maintained at a warm serving temperature.

Rotary grills are typically mounted on a counter top or other support surface near a point-of-sale so the consumer can view the hot dogs and other items being grilled. For example, a conventional rotary grill may have an inside depth of about fifteen (15) inches and support ten (10) heated rollers within its grilling area. The ten (10) rollers define nine (9) food receiving areas between adjacent pairs of the rollers so that the rotary grill has a capacity of between eighteen (18) and twenty-seven (27) hot dogs, depending on whether two (2) or three (3) hot dogs are placed side-by-side in each food receiving area.

Conventional rotary grills suffer from several drawbacks and shortcomings. For example, conventional rotary grills may be generally limited in their hot dog grilling, heating and holding capacity for a particular counter space of a vendor. The layout of the heated rollers in a conventional rotary grill design can also make it difficult for a vendor to safely reach hot dogs supported on the rear rollers. Additionally, the layout of the heated rollers does not assist the vendor in merchandising different food products since all of the food products are typically mixed within the same grilling area.

The present invention overcomes these known drawbacks and shortcomings of conventional rotary grills.

SUMMARY OF THE INVENTION

The present invention overcomes the foregoing and other shortcomings and drawbacks of rotary grills and methods of heating hot dogs and similar food items heretofore known. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a multi-tier rotary grill includes heated rollers that are arranged in vertically spaced apart roller tiers, such as three (3) roller tiers by way of example, for grilling and heating hot dogs, sausages, metts and similar food items. The rollers are rotatably mounted at their opposite ends to a housing of the rotary grill and are spaced apart from each a sufficient distance so that hot dogs or other food items can be placed between and supported by adjacent pairs of the rollers in each respective roller tier.

The rollers in the multiple roller tiers lie in common respective planes that are substantially parallel to each other and may slope upwardly from the front to the back of the housing. Alternatively, the common planes may be horizontally disposed. Each roller tier may be staggered from the rear to the front of the rotary grill so that one or more rollers of one roller tier overlie one or more rollers of another roller tier. This allows the rotary grill of the present invention to support more rollers, and thus grill, heat and hold more hot dogs, as compared to conventional rotary grills of the same inside depth.

Each of the roller tiers has a pair of opposite brackets mounted to the housing of the rotary grill for supporting non-rotatable heating rods or elements in contact with inner surfaces of the rollers to heat the rollers to a predetermined temperature. The rollers rotate in contact with the hot dogs so that the hot dogs are evenly heated or grilled.

In accordance with one aspect of the present invention, each roller tier has a separate temperature control coupled to the heating rods or elements of each respective roller tier so that the temperature of the rollers in each roller tier is independently controllable relative to the temperature of the rollers in another roller tier. This allows one or more of the roller tiers to be set to a higher temperature to bring cold hot dogs up to temperature quickly while one or more other roller tiers can be set to a lower temperature to maintain proper serving temperatures.

In accordance with another aspect of the present invention, each roller tier has a separate drive chain and motor control so that rotation of the rollers in each respective roller tier is independently controllable relative to the rotation of the rollers in another roller tier. This allows one or more of the roller tiers to be turned off when not in use to provide cost efficient and safe use of the rotary grill.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
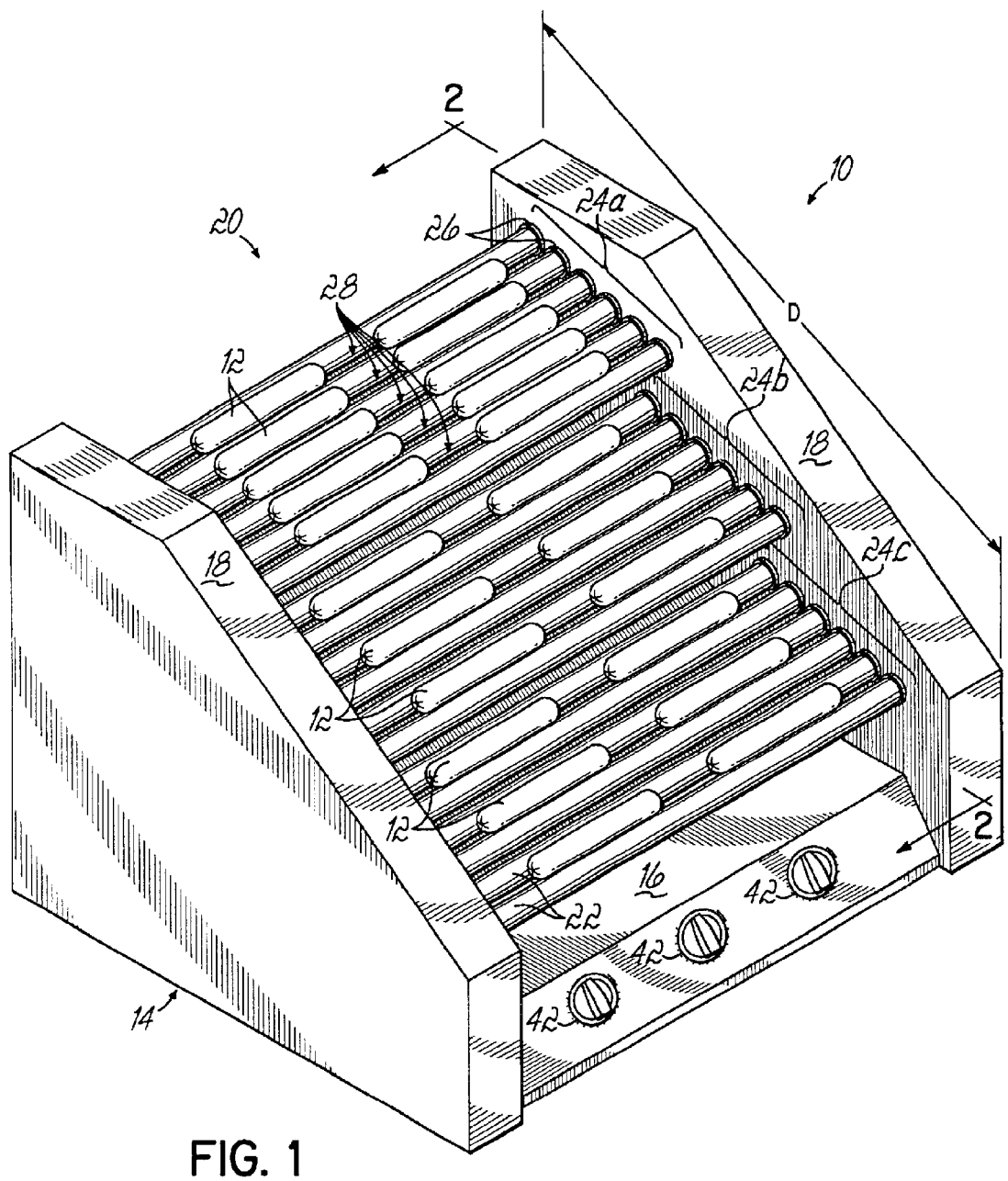
FIG. 1 is a perspective view of a multi-tier rotary grill in accordance with the principles of the present invention.
Figure 2:
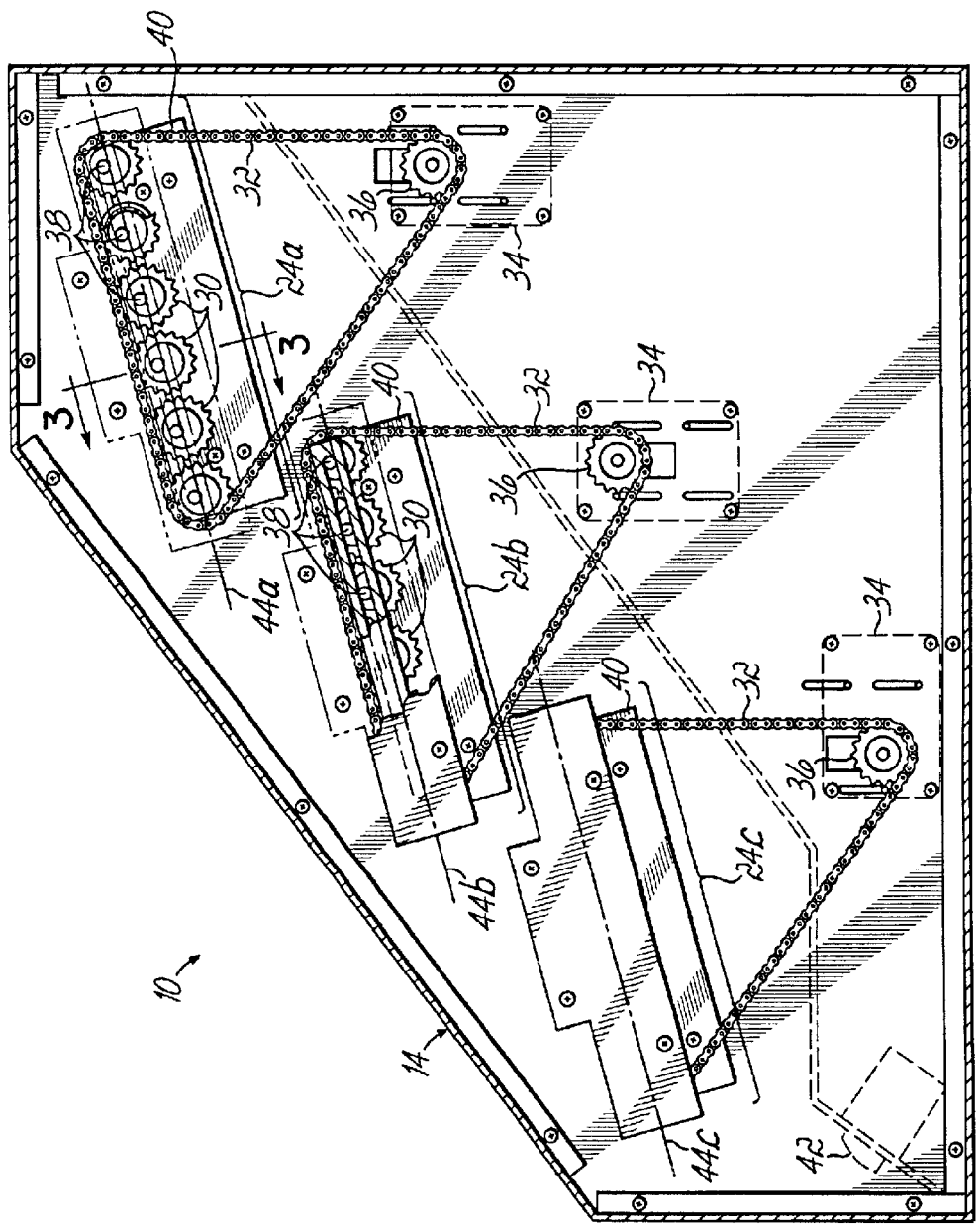
FIG. 2 is a cross-sectional view of the multi-tier rotary grill taken along line 2—2 of FIG. 1.

With reference to FIGS. 1 and 2, a multi-tier rotary grill 10 is shown in accordance with the principles of the present invention for grilling and heating hot dogs, sausages, metts and similar food items. For the sake of simplicity, the present invention will be described herein in connection with grilling and heating hot dogs 12, but those skilled in the art will appreciate the applicability of the present invention to grilling and heating other food items as well.

Rotary grill 10 includes a housing 14 having a base 16 and a pair of spaced apart side walls 18 extending upwardly from the base 16 that define a grilling area 20 having an inside depth designated as "D" in FIG. 1. As will be described in greater detail below, and in accordance with the principles of the present invention, the rotary grill 10 includes heated rollers 22 that are supported for rotation between the side walls 18 of the housing 14 and are arranged in vertically spaced apart roller tiers 24a–24c for grilling and heating the hot dogs 12 or other food items within the grilling area 20.

The rollers 22 are preferably made of stainless steel and are rotatably mounted at their opposite ends to respective pairs of TEFLON bearings 26 that are supported by the side walls 18. The rollers 22 are arranged generally parallel to each other in each roller tier 24a–24c and are spaced apart from each other a sufficient distance so that hot dogs 12 or other food items can be placed between and supported by adjacent pairs of rollers 22 in each respective roller tier 24a–24c.

For example, as shown in FIGS. 1 and 2, rotary grill 10 may have an inside depth "D" of fifteen (15) inches and each roller tier 24a–24c may comprise an array of six (6) rollers 22 that define five (5) food receiving areas 28 between adjacent pairs of rollers 22 in each respective roller tier 24a–24c. In one embodiment, each roller tier 24a–24c is capable of supporting ten (10) hot dogs 12 so the capacity of the rotary grill 10 is thirty (30) hot dogs. If each food receiving area 28 receives three (3) side-by-side hot dogs 12 instead of two (2) hot dogs 12 as shown, the capacity of the rotary grill 10 is increased to forty-five (45) hot dogs. Thus, the rotary grill 10 of the present invention is able to grill, heat and hold twelve (12) to fifteen (15) more hot dogs as compared to a conventional rotary grill of the same inside depth "D". Of course, the number of rollers 22 arranged in each roller tier 24a–24c, the number of roller tiers supported by the housing 14 of the rotary grill 10, and the number of side-by-side hot dogs 12 received in each food receiving area 28 could be changed without departing from the spirit and scope of the present invention to increase or decrease the hot dog holding capacity of the rotary grill 10 as desired.

Each roller 22 in a respective roller tier 24a–24c includes a sprocket 30 mounted at one end of the roller 22 that meshes with a drive chain 32 coupled to a motor control 34. Each roller tier 24a–24c has a separate drive chain 32 and a separate motor control 34 so that rotation of the rollers 22 in each respective roller tier 24a–24c is independently controllable relative to the rotation of rollers 22 in another roller tier. In one embodiment, the motor control 34 for each roller tier 24a–24c has a drive sprocket 36 having the same number of teeth as the sprocket 30 associated with each roller 22. In this way, one or more of the roller tiers 24a–24c can be placed into an inoperative condition when not in use simply by turning "off" the motor control 34 associated with the unused roller tier.

A conventional non-rotatable heating rod or element 38 is mounted within each roller 22 and is supported at its opposite ends by a pair of brackets 40 mounted to the opposite side walls 18 of the housing 14. Each roller tier 24a–24c has a pair of opposite brackets 40 for supporting the heating rods or elements 38 in contact with the inner surfaces of the respective rollers 22 to heat the rollers 22 to a predetermined temperature. The rollers 22 rotate in contact with the hot dogs 12 so that the hot dogs 12 are evenly heated or grilled. As shown in FIG. 1, each roller tier 24a–24c has a separate temperature control 42 coupled to the heating rods or elements 38 of the respective roller tiers 24a–24c so that the temperature of the rollers 22 in each 24a–24c is independently controllable relative to the temperature of rollers 22 in another roller tier. In this way, one or more of the roller tiers 24a–24c can be set to a higher temperature to bring cold hot dogs 12 up to temperature quickly while one or more other roller tiers 24a–24c can be set to a lower temperature to maintain proper serving temperatures.

In one embodiment of the present invention, the rollers 22 in the roller tiers 24a–24c lie in substantially common respective planes 44a–44c (FIG. 2). It will be appreciated that rollers 22 are considered to lie in a common plane even if the rollers 22 within a roller tier 24a–24c are slightly staggered or offset relative to each other. The common planes 44a–44c are substantially parallel to each other and may slope upwardly from the front to the rear of the housing 14 as shown in FIGS. 1 and 2. In an alternative embodiment (not shown), the common planes 44a–44c may be generally horizontally disposed. Each roller tier 24a–24c may be staggered from the rear to the front of the rotary grill 10 so that one or more rollers 22 of one roller tier 24a–24c may overlie one or more rollers 22 of another roller tier. For example, rollers 22 of roller tier 24a overlie rollers 22 of roller tier 24b.

Similarly, rollers 22 of roller tier 24b overlie rollers 22 of roller tier 24c. In this way, the rotary grill 10 of the present invention supports more rollers 22, and thus is able to grill, heat and hold more hot dogs, as compared to a conventional rotary grill of the same inside depth "D".

It will be appreciated by those of ordinary skill in the art that the arrangement of roller tiers 24a–24c in rotary grill 10 provides many advantages over conventional rotary grills for the same purpose. For example, for the same grilling area depth "D", the provision of multiple tiers of rollers 22 increases the hot dog holding capacity of the rotary grill 10 of the present invention over conventional rotary grills having a single array of rollers lying in a common plane. The multiple roller tiers 24a–24c provide easy accessability to hot dogs 12 that may be positioned on the rearward roller tier 24a and improve merchandising and visibility of the food items to the consumer. For example, each roller tier 24a–24c may be dedicated to heating or grilling a different type of food item so that the available food products for sale are segregated for easy viewing and selection by a consumer. Moreover, the independent motor and temperature controls 34 and 42, respectively, dedicated to each roller tier 24a–24c permit the rotary grill 10 to be used in a cost efficient and safe manner.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. Apparatus for heating elongated food items, comprising:

a housing having a pair of spaced apart side walls;

a first plurality of elongated rollers each having a rotational axis and being mounted for rotation about a respective one of the rotational axes relative to said housing in a first roller tier, each of said first plurality of rollers being spaced apart to receive the food items therebetween for contacting and transferring heat to the food items during rotation of said first plurality of rollers, said first roller tier and the rotational axes of said first plurality of rollers being fixed relative to said housing;

a first plurality of heaters mounted respectively within each of said first plurality of rollers;

a second plurality of elongated rollers each having a rotational axis and being mounted for rotation about a respective one of the rotational axes relative to said housing in a second roller tier spaced vertically apart from said first roller tier, each of said second plurality of rollers being spaced apart to receive the food items therebetween for contacting and transferring heat to the food items during rotation of said second plurality of rollers, said second roller tier and the rotational axes of said second plurality of rollers being fixed relative to said housing; and a second plurality of heaters mounted respectively within each of said second plurality of rollers;

wherein said first and second roller tiers are supported by and extend between said pair of spaced apart side walls and are staggered relative to each other from a rear to a front of said housing.

2. The apparatus of claim 1, wherein said first plurality of rollers in said first roller tier lie in a substantially common first plane.

3. The apparatus of claim 2, wherein said second plurality of rollers in said second roller tier lie in a substantially common second plane.

4. The apparatus of claim 3, wherein said first and second planes are substantially parallel.

5. The apparatus of claim 3, wherein said first and second planes are upwardly inclined from the front toward the rear of said housing.

6. The apparatus of claim 3, wherein said first and second planes are substantially horizontally disposed.

7. The apparatus of claim 1, further comprising a first heater control associated with said first plurality of rollers and operable to control heating of said first plurality of rollers to a predetermined temperature.

8. The apparatus of claim 7, further comprising a second heater control associated with said second plurality of rollers and operable to control heating of said second plurality of rollers to a predetermined temperature.

9. The apparatus of claim 8, wherein said first and second heater controls are independently controllable.

10. The apparatus of claim 1, further comprising a first drive mechanism associated with said first plurality of rollers and operable to rotate said first plurality of rollers.

11. The apparatus of claim 10, further comprising a second drive mechanism associated with said second plurality of rollers and operable to rotate said second plurality of rollers.

12. The apparatus of claim 11, wherein said first and second drive mechanisms are independently controllable.

13. Apparatus for heating elongated food items, comprising:

a housing having a pair of spaced apart side walls;

a first plurality of elongated rollers each having a rotational axis and being mounted for rotation about a respective one of the rotational axes between said side walls in a first roller tier, each of said first plurality of rollers being spaced apart to receive the food items therebetween for contacting and transferring heat to the food items during rotation of said first plurality of rollers, said first roller tier and the rotational axes of said first plurality of rollers being fixed relative to said housing;

a first plurality of heaters mounted respectively within each of said first plurality of rollers;

a second plurality of elongated rollers each having a rotational axis and being mounted for rotation about a respective one of the rotational axes between said side walls in a second roller tier spaced vertically apart from said first roller tier, each of said second spaced apart to receive the food items therebetween for contacting and transferring heat to the food items during rotation of said second plurality of rollers, said second roller tier and the rotational axes of said second plurality of rollers being fixed relative to said housing;

a second plurality of heaters mounted respectively within each of said second plurality of roller;

a third plurality of elongated rollers each having a rotational axis and being mounted for rotation about a respective one of the rotational axes between said side walls in a third roller tier spaced vertically apart from said first and second roller tiers, each of said third plurality of rollers being spaced apart to receive the food items therebetween for contacting and transferring heat to the food items during rotation of said third plurality of rollers, said third roller tier and the rotational axes of said third plurality of rollers being fixed relative to said housing; and a third plurality of heaters mounted respectively within each of said third plurality of rollers;

wherein said first, second and third roller tiers are supported by and extend between said pair of spaced apart side wells and are staggered relative to each other from a rear to a front of said housing.

14. The apparatus of claim 13, wherein at least one roller of said first roller tier overlies at least one roller of said second roller tier.

15. The apparatus of claim 14, wherein at least one roller of said second roller tier overlies at least one roller of said third roller tier.

16. The apparatus of claim 13, wherein said first plurality of rollers in said first roller tier lie in a substantially common first plane.

17. The apparatus of claim 16, wherein said second plurality of rollers in said second roller tier lie in a substantially common second plane.

18. The apparatus of claim 17, wherein said third plurality of rollers in said third roller tier lie in a substantially common third plane.

19. The apparatus of claim 18, wherein said first, second and third planes are substantially parallel.

20. Apparatus for heating elongated food items, comprising:

a housing having a pair of spaced apart side walls; and a plurality of elongated rollers each having a rotational axis and being mounted for rotation about a respective one of the rotational axes relative to said housing and arranged into a plurality of vertically spaced apart roller tiers, each of said plurality of rollers being spaced apart to receive the food items therebetween for contacting and transferring heat to the food items during rotation of said plurality of rollers, each of said plurality of roller tiers and the rotational axes of said plurality of rollers being fixed relative to said housing; and a plurality of heaters mounted respectively within each of said plurality of rollers;

wherein each of said plurality of roller tiers is supported by and extends between said pair of spaced apart side walls and is staggered relative to said other roller tiers from a rear to a front of said housing.

21. The apparatus of claim 20, wherein a roller of one of said plurality of roller tiers overlies a roller of another one of said plurality of roller tiers.

22. A method of heating elongated food items by contacting the food items with a plurality of rollers each having a rotational axis and being mounted for rotation about a respective one of the rotational axes relative to a housing having a pair of spaced apart side walls, the plurality of rollers each having a heater mounted therein and being arranged into vertically spaced roller tiers with each roller tier and the rotational axes of the plurality of rollers being fixed relative to the housing and each of the plurality of roller tiers being supported by and extending between the pair of spaced apart side walls so as to be staggered relative to the other roller tiers from a rear to a front of the housing, comprising:

contacting the food items with the plurality of rollers;

rotating the plurality of rollers; and applying heat to the plurality of rotating rollers to transfer heat to the food items.

23. The method of claim 22, further comprising the step of independently controlling the application of heat to the plurality of rollers in each vertically spaced roller tier.

24. The method of claim 22, further comprising the step of independently controlling the rotation of the plurality of rollers in each vertically spaced roller tier.

* * * * *

UNITED STATES PATENT AND TRADEMARK OFFICE
CERTIFICATE OF CORRECTION

PATENT NO.    : 6,800,314 B2
DATED         : October 5, 2004
INVENTOR(S)   : Evans et al.

It is certified that error appears in the above-identified patent and that said Letters Patent is hereby corrected as shown below:

Column 4,
Line 30, "Similarly, rollers 22 of roller tier 24*b*" should not begin a new paragraph.

Column 6,
Line 20, change "each of said second spaced apart to" to -- each of said second plurality of rollers being spaced apart to --.
Line 27, change "each of said second plurality of roller;" to -- each of said second plurality of rollers; --.
Line 43, change "spaced apart side wells" to -- spaced apart side walls --.

Signed and Sealed this

Eighth Day of February, 2005

JON W. DUDAS
*Director of the United States Patent and Trademark Office*